United States Patent [19]
Pickett

[11] 4,282,743
[45] Aug. 11, 1981

[54] LEAK TEST FITTING

[75] Inventor: Patrick T. Pickett, Kettering, Ohio

[73] Assignee: The United States of America as represented by the United States Department of Energy, Washington, D.C.

[21] Appl. No.: 76,527

[22] Filed: Sep. 18, 1979

[51] Int. Cl.³ ............................................. G01M 3/20
[52] U.S. Cl. .......................................... 73/46; 73/40.7
[58] Field of Search ................. 73/46, 40.7, 40, 40.5 R

[56] References Cited

U.S. PATENT DOCUMENTS

| 784,483 | 3/1905 | Erk | 73/46 |
|---|---|---|---|
| 2,255,921 | 9/1941 | Fear | 73/46 |
| 2,766,614 | 10/1956 | Cook | 73/46 |

FOREIGN PATENT DOCUMENTS

| 812848 | 9/1951 | Fed. Rep. of Germany | 73/46 |
|---|---|---|---|
| 999965 | 10/1951 | France | 73/46 |
| 542164 | 12/1941 | United Kingdom | 73/46 |
| 247578 | 11/1969 | U.S.S.R. | 73/40.7 |

Primary Examiner—Gerald Goldberg
Assistant Examiner—Joseph W. Roskos
Attorney, Agent, or Firm—George H. Libman; Dudley W. King; James E. Denny

[57] ABSTRACT

A hollow fitting for use in gas spectrometry leak testing of conduit joints is divided into two generally symmetrical halves along the axis of the conduit. A clip may quickly and easily fasten and unfasten the halves around the conduit joint under test. Each end of the fitting is sealable with a yieldable material, such as a piece of foam rubber. An orifice is provided in a wall of the fitting for the insertion or detection of helium during testing. One half of the fitting also may be employed to test joints mounted against a surface.

3 Claims, 1 Drawing Figure

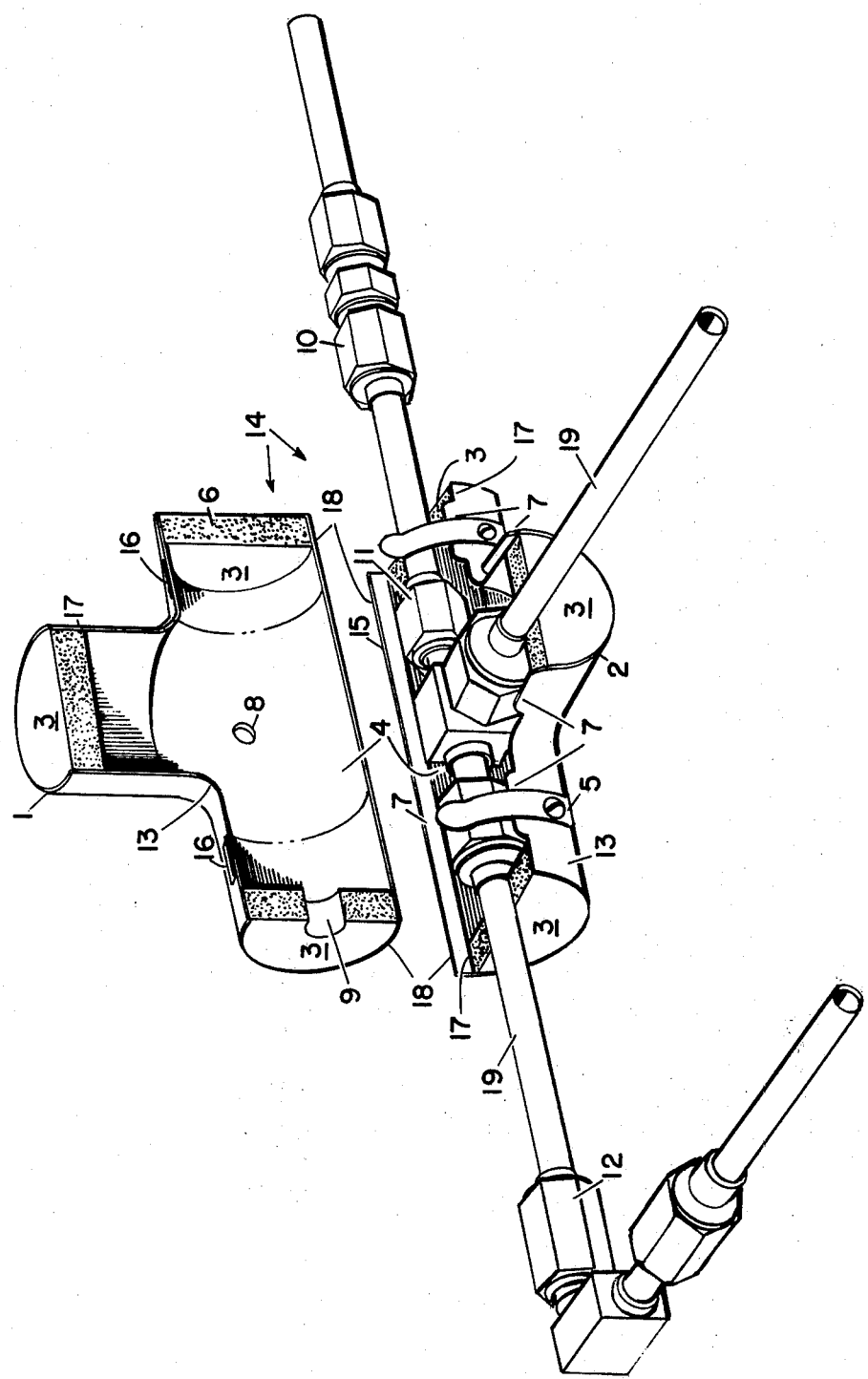

LEAK TEST FITTING

BACKGROUND OF THE INVENTION

Mechanical joints for pressurized fluid handling tubing offer a large measure of convenience to the laboratory worker in that they may be easily assembled and disassembled in accordance with constantly changing system needs of the user. However, this convenience must be balanced with the possibility of leaks developing in the system at the joints. The invention described herein relates generally to an apparatus for simplifying mass spectrometer leak detector tests of these joints. More particularly, it relates to a rigid fitting which is snapped over a joint to be tested. It is a result of a contract with the Department of Energy.

DESCRIPTION OF THE PRIOR ART

The use of mass spectrometers has long been known for determining the presence of a leak in a conduit joint. In a typical prior system, a readily identifiable gas such as helium is placed under pressure in the conduit to be tested. This conduit is then placed in an evacuated chamber with a mass spectrometer to detect the presence of helium escaping into the chamber through a leak in the joint. A bibliography of early leak detector work is presented in U.S. Pat. No. 3,690,151.

The aforementioned test is not practical for laboratory use as it requires extensive equipment. Another method for testing joints developed by laboratory workers involves enclosing a conduit joint to be tested in a "bag" of plastic film attached to the conduit by pressure-sensitive tape—that is, plastic film material is first formed or wrapped about the conduit assembly so as to completely envelope it in a sort of "bag" and the material is then taped into position; each joint of conduit assembly to be tested being similarly "bagged" by having such a wrapping and sealing accomplished about it. Helium is thereafter blown into the "bag" and the line under test is partially evacuated. If the "bag" encloses a leak, helium will flow through the leak into the conduit and be detected by a spectrometer.

Although the "bagging" technique has provided laboratory workers with a manageable leak detector test, it has not been without inconvenience to the user. Each time a test is made the worker must cut, fit and tape plastic in order to customize a bag over the joint. This tedious process is wasteful of both time and materials.

Another method of testing joints developed by laboratory workers involves pressurizing the conduit to be tested with helium and placing a detector probe in the vicinity of the suspected leak. The detector probe is a hollow tube with a small orifice at the tip. The probe is evacuated and connected to a mass spectrometer. Helium escaping through a leak is drawn into the probe and registered by the mass spectrometer. This method is not as sensitive as the "bagging" method, as helium escaping through the leak often is not registered by the spectrometer. Stray air currents or too-rapid probe movement also adversely affect the results of this method.

Several prior devices bear a superficial physical resemblance to the invention. U.S. Pat. No. 4,043,333 discloses an injection site which can be clamped onto vinyl tubing. U.S. Pat. No. 4,015,634 and U.S. Pat. No. 3,517,701 each disclose a clamp which is bolted around a conduit to seal a leak or, for the U.S. Pat. No. 4,015,634, to also permit tapping a conduit with another line. However, none of these devices teaches or discloses the necessary features of this invention to make them useful as practical leak detector fittings.

OBJECTS OF THE INVENTION

It is, therefore, a principal object of the present invention to provide a fitting which will fit about a conduit joint under test to facilitate surrounding the joint with helium.

It is also a principal object of the present invention to provide a fitting which will fit about a conduit joint under test to collect helium leaking from the joint.

It is another object of the invention to provide a test fitting which can enclose any of a plurality of arrangements of joints, including joints in conduits mounted along a surface.

It is a further object of this invention to provide a test volume which can be quickly and easily clipped onto and off of the joint under test to permit the rapid, repeated testing of a plurality of joints by workers in a laboratory without the mess, inconvenience, and time involved with prior "bagging" techniques.

Other objects, advantages, and novel features of the invention will become apparent to those skilled in the art upon examination of the following detailed description of a preferred embodiment of the invention and the accompanying drawings.

SUMMARY OF THE INVENTION

In accordance with the principles of the present invention, a fitting is provided for use with a mass spectrometer leak detector wherein a joint in a conduit is enclosed by a volume and a detector is coupled thereto to detect the presence of helium which passed through a leak enclosed by the volume. The versatile fitting may be used either to insert helium into a joint in an evacuated conduit or to confine for detection helium leaking from a joint in a pressurized conduit. The fitting includes a pair of substantially identical rigid housing halves having continuous edges designed to be secured or snapped together without tools to enclose a conduit joint under test within a volume. One of the housing halves is provided with an orifice for either the passage of helium into the volume or the entrance of a probe into the volume. The continuous edge of the housing half having the orifice lies entirely within a plane, enabling this half to be used to enclose and test a portion of a conduit fastened against a surface. The continuous edge of the other housing half contains a plurality of abutments extending beyond the edge of this half to restrain the edge of the other half against lateral movement when the halves are joined together around an exposed conduit. The ends of the fitting are each loosely sealed by a split yieldable sealing element, half of which element is fastened into the end of each housing half. When the housing halves are around a conduit, the sealing elements yield to provide a barrier at the end of the enclosure with a passage for the conduit.

BRIEF DESCRIPTION OF THE DRAWING

A more complete understanding of the present invention may be had by referring to the following detailed description when taken in connection with the accompanying drawing wherein an exploded perspective view shows the two halves of the fitting of the invention on opposite sides of a conduit joint to be tested.

DESCRIPTION OF THE INVENTION

In accordance with the invention, fitting 14 includes substantially identical housing members 1 and 2 for surrounding conduit 19, thereby enclosing mechanical joint 11 inside hollow space 4. Housing members 1 and 2 each have rigid walls 13, preferably manufactured of metal to form a structure having a continuous edge 17 and at least two ends 18. In the illustrated embodiment, fitting 14 is configured in the general shape of a Tee, thereby permitting it to be universally used with joints such as straight line 10, elbow 12, or Tee 11 as shown in the drawing. It is also contemplated that fitting 14 could be configured to fit only a straight pipe or an elbow. It is further contemplated that fitting 14 could have the configuration of a cross in order to test crossing conduits, or any other configuration necessary to enclose a particular conduit joint.

Preferably, the edges 17 of each housing are formed with a plurality of straight portions 15 so that the volume 4 enclosed by fitting 14 has a cross-sectional area which is relatively constant throughout the length of the fitting. For the embodiment shown, a cross section of each of housing members 1 and 2 taken in a plane perpendicular to the axis of the conduit has the shape of a semi-circle. Since this invention is intended to be a low pressure enclosure, the fitting may be advantageously manufactured from a relatively thin, constant diameter tubing. This construction advantageously does not have internal braces, walls, or the like found in the leak sealing clamps referenced above, as such additional structure could interfere with and contact the joint under test to prevent helium from readily reaching or escaping from a leak situated under the point of contact. In this invention the cross-sectional area of the volume enclosed by the fitting is made larger than the exterior cross-sectional area of the conduit under test to ensure that helium may flow to all enveloped surfaces of the conduit.

Each end of fitting 14 has a sealing element 3 carried thereby constructed of such material as foam rubber, yieldable foam plastic, or the like, to fit about a conduit joint and restrict the flow of helium from the fitting during a test. In accordance with the invention, each element 3 is a relatively thin piece of the yieldable material generally filling the cross-sectional area of the end of each housing member. When the housing members are fastened to form fitting 14, the sealing elements in each half abut to form a barrier at each end of the fitting. In one embodiment of the invention an indentation 9 is formed in each barrier to enhance centering of the conduit in the fitting. When the configuration of the conduit under test is such that the end of the fitting does not pass a conduit, then the opening in barrier 3 formed by indentation 9 will permit the escape of some helium. Although this loss should not effect the results of the test, it may be prevented by temporarily plugging the opening formed by indentation 9. Should these indentations be omitted from barrier as further contemplated by this invention and shown at 6, the yieldable sealing element 3 will conform to the outer wall of the conduit, allowing its passage but maintaining a seal. Without indentations, the end of fixture 14 will be completely sealed by the barrier 3 when no conduit passes through it.

In order for the fitting 14 to be advantageously used for the rapid and repeated testing of a plurality of joints, it is capable of being assembled, fastened, and unfastened from each joint quickly and easily. In accordance with an embodiment of the invention, housing member 2 is provided with abutment 7 along each straight portion 15. Each abutment 7 is preferably a thin piece of metal which extends the outer wall of member 2 beyond its edge 17 whereby the outer wall of member 1 will be restrained by the abutment against movement when the edges of the members are fitted together. Member 2 is also provided with at least one spring clip 5 extending over and exerting pressure on member 1 when the fitting 14 is assembled. Preferably, housing member 1 is provided with a boss 16 over which clip 5 will snap, thereby firmly holding the housing members in alignment around the joint under test.

An additional advantage of abutments 7 of the preferred embodiment is that they increase the effectiveness of the helium seal around the edge of the assembled fitting.

From the construction noted above, it is readily seen that the fitting of this invention may quickly and easily be snapped around a joint under test without the use of tools or extra fasteners.

As shown, the structure of the invention described above is completed with the provision of an orifice 8 in a central portion of housing member 1. Orifice 8 is configured to mate either with the output of a source of helium when the evacuated conduit is being tested or with a test probe when the pressurized conduit is being tested.

In a preferred use, when a laboratory worker desires to use this invention to easily test a conduit joint for a leak, a mass spectrometer is attached to the partially evacuated conduit. The two members of fitting 14 are readily fitted around the joint under test and clip 5 is snapped over member 1 to retain the fitting on the joint. Helium is then inserted through orifice 8 into hollow interior 4 surrounding the joint. Seals 3 keep the helium within the fitting where it can flow through a leak in the joint and be detected by the spectrometer. After the test the fitting is quickly unsnapped and moved to the next joint to be tested. No time consuming "bagging" techniques and materials are required.

If the worker chooses to use the pressurized conduit method of leak detection, the fixture is snapped over the joint under test to concentrate the escaping helium, thus increasing the probability of its detection by providing protection from stray air currents which might otherwise convey the helium away from the detector probe, thus causing a leak to be missed altogether.

Since housing member 1 is designed with straight portions 15 of continuous edge 17 being entirely within a plane, the invention may also be advantageously used to detect leaks in conduits mounted permanently and rigidly against a flat surface. Although the entire test fixture cannot be mounted around these conduits, housing member 1 may be held over the joint under test with edges 17 touching the wall and seals 3 being deformed by the conduit to form a volume with which the test may be carried out as discussed above.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

I claim:

1. A device for use with a helium mass spectrometer leak detector wherein a joint in a conduit under test is enclosed by a volume, helium is placed in one of the volume or the conduit and the detector is connected to the other of the volume or the conduit to detect helium which passed through a leak in the joint, the joint being mounted against a flat surface, said device comprising: a housing member including a rigid wall forming a structure having a continuous edge and at least two ends, said edge being entirely within a plane, said housing member when held with said edge against the surface completely enclosing a conduit joint under test, the cross-sectional area of the interior of said housing member being relatively constant throughout the length thereof and larger than the exterior cross-sectional area of the conduit joint under test, thereby providing a volume around the conduit joint; a yieldable sealing element carried by said housing member at each end thereof, each of said elements generally filling the cross-sectional area at the end of the interior of said housing member to provide a yieldable barrier across each end of the hollow housing for sealing against a conduit; and an orifice through the wall of said member communicating with said volume for the passage of helium.

2. A device for use with a helium mass spectrometer leak detector wherein a conduit joint is enclosed by a volume, helium is injected into one of the volumes or the conduit and the detector is coupled to the other of the volume or the conduit to detect the presence of helium which passed through a leak in a joint enclosed by said device, said device comprising: a pair of substantially identical housing members, each member having a thin rigid wall forming a structure having a continuous edge including a plurality of straight portions and at least two ends; means for releasably holding the edges of said housing members together comprising abutment means fastened along each straight portion of one of said housing members for restraining the edge of said other member when said housing members are together, and spring clip means fastened opposite one of said abutment means for releasably restraining said members together, said members when fastened by said means completely enclosing a conduit joint under test, the cross-sectional area of the interior of said housing members being relatively constant throughout the length thereof and larger than the exterior cross-sectional area of the conduit joint under test, thereby providing the volume around the conduit joint; a pair of substantially identical yieldable sealing elements carried by said pair of housing members at each end thereof, each of said elements generally filling the cross-sectional area of the interior of the end of said member to provide a yieldable barrier for sealing against a conduit; and an orifice through the wall of said other member communicating with said volume for the passage of helium.

3. The device of claim 2 wherein the barrier formed by said yieldable sealing elements when said members are fastened together has a centered opening for the passage of the conduit, the opening being sized so that the barrier will fit snugly around the conduit.

* * * * *